United States Patent Office 3,336,354
Patented Aug. 15, 1967

3,336,354
DEHYDROGENATION OF 1,2-DICYANOCYCLOBU-
TANES TO THE CORRESPONDING 1,2-DICYANO-
CYCLOBUTENES
Janice L. Greene, Warrensville Heights, and Murrel Godfrey, Cleveland, Ohio, assignors to The Standard Oil Company, Cleveland, Ohio, a corporation of Ohio
No Drawing. Filed Apr. 19, 1965, Ser. No. 449,293
8 Claims. (Cl. 260—464)

ABSTRACT OF THE DISCLOSURE 1,2-dicyanocyclobutanes are converted to the corresponding 1,2-dicyanocyclobutenes by the dehydrogenation action of molecular chlorine and a promoter such as iodine, iodine monochloride, sulfur monochloride, isopropyl iodide, sulfur, benzoyl peroxide and tertiary butyl peroxide.

This invention relates to a process for preparing 1,2-dicyanocyclobutenes from 1,2-dicyanocyclobutanes and more particularly pertains to the process for dehydrogenation of 1,2-dicyanocyclobutanes to the corresponding 1,2-dicyanocyclobutenes by means of the promoted action of molecular chlorine.

The chlorinative dehydrogenation reaction embodied herein is believed to be unique. It is known that iodine alone will catalyze the dehydrogenation of some hydrocarbons and this is illustrated in U.S. Patent No. 2,901,520. Iodine alone does not catalyze the instant reaction at all.

We have discovered that a 1,2-dicyanocyclobutane having the structure

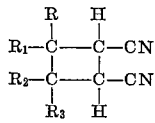

can be catalytically dehydrogenated in the presence of promoted molecular chlorine to a compound having the structure

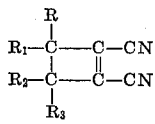

wherein R, $R_1$, $R_2$ and $R_3$ each is a member independently selected from the group consisting of hydrogen and a hydrocarbon radical, preferably an alkyl group, having from 1 to 6 carbon atoms. Most preferred in the instant process as a starting material is 1,2-dicyanocyclobutane itself.

The promoters useful in conjunction with the essential molecular chlorine in the present process include iodine, iodine monochloride, iodine trichloride, sulfur monochloride, sulfur dichloride, sulfur tetrachloride, sulfuryl chloride, thionyl chloride, sulfur dioxide, hydrogen sulfide, alkyl iodides such as isopropyl iodide, elemental sulfur, tetraalkyl leads such as tetraethyl lead, pyrrolidine and peroxide compounds including ROOH, ROOR,

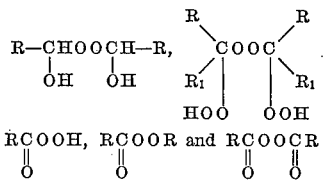

wherein each R may be the same or different and each represents a hydrocarbon group having from 1 to 10 carbon atoms such as benzoyl peroxide, tertiary butyl peroxide, and the like.

It is preferred that the process of this invention be carried out in the temperature range of from about 50 to 170° C. and preferably from about 75–150° C. It has been found that temperatures above about 170° C. lead to excessive decomposition and polymerization of the product. The reaction pressure is not critical although for convenience the reaction is usually carried out at about atmospheric pressure. The chlorine is usually fed into the reaction mixture at the rate of about 0.01 to 1.0 mole of chlorine per mole of the 1,2-dicyanocyclobutane reactant. Molar ratios of from 0.04 to 0.06 of chlorine per mole of 1,2-dicyanocyclobutane are usually preferred.

The amount of promoter used in any specific reaction varies with the particular promoter used. For example, as little as 0.1 to 10% by weight based on the weight of the 1,2-dicyanocyclobutane of a promoter such as benzoyl peroxide or sulfur monochloride may be used whereas 10% by weight or more of iodine can be used advantageously.

The process of this invention is further illustrated in the following example.

Example

All of the experimental work described herein was done in an apparatus which was equipped with a column which was either an 18″ x ¾″ or 30″ x ¾″ Pyrex tube packed with ¼″ Burl saddles and heated externally by a Variac-controlled electrical heating tape. The reaction temperature was measured by means of a thermocouple located in a well in the center of the packed column. The cyclic acrylonitrile dimer (1,2-dicyanocyclobutane) together with any additives or promoters employed in the particular reaction was contained in a reservoir (500 ml. capacity) attached to the bottom of the column. This feed was continuously pumped from the bottom of the reservoir by means of a dip tube and external pump with a line from the dip tube to the top of the column where it trickled down slowly through the packed column and back to the reservoir. The pumping rate was generally such that the feed resided about ⅓ of the time in the column and about ⅔ of the time in the rest of the system (reservoir, lines and pump). A sampling point in the liquid feed line allowed periodic monitoring of the liquid composition.

Gaseous chlorine was metered into the column at an entrance point located about 4″ above the feed reservoir for the counter-current studies and allowed to pass up the column. Attached to the top of the column was a water-cooled condenser for returning condensable material to the column. A cold trap at the top of the water-cooled condenser collected volatile materials which were not condensed in the condenser. For concurrent chlorinative dehydrogenation experiments, the apparatus was modified slightly by moving the chlorine entry port to the top of the column and providing a vent with water-cooled condenser and cold traps in a line from the reservoir.

Using the foregoing apparatus, the following standard procedure was employed in carrying out the experiments summarized in the table. Three moles (318 g.) of trans-1,2-dicyanocyclobutane were placed in the reservoir in the molten state and the cycling of the reactants through the column which was preheated to 60° C. was started immediately before the 1,2-dicyanocyclobutane could solidify. An alternate starting procedure which could also be employed was the use of 25 ml. of carbon tetrachloride in the 3-mole cyclic acrylonitrile dimer feed to maintain the liquid state.

Gaseous chlorine was next fed to the column at the rate of 0.044 mole per mole of 1,2-dicyanocyclobutane recycle. The reaction was exothermic and the reaction temperature quickly reached 95–120° C. at which point it leveled off with no further heat input required. Samples of the liquid recycle were taken each hour and were analyzed for 1,2-dicyanocyclobutane and 1,2-dicyanocyclobutene by vapor chromatography.

Analyses for all experiments were performed with a Burrell K–2 Kromotog equipped with a flash vaporizer maintained at 260–300° C. and temperature programmer. The analytical column was a 2.5 meter column packed with 4% of Versamid 900 (a polyamide of 6000–9000 molecular weight prepared by the polymerization of dilinoleic acid with ethylene diamine) on Diatoport S (a diatomaceous earth which has been treated with dimethyl dichlorosilane) supplied as 60–80 mesh. The helium flow was maintained at 100 cc. per minute while the programmed temperature rise was 100 to 300° C. over a period of 25 minutes. The chromatographic column was standardized with prepared solutions of known concentrations while the retention times and peak identities were confirmed by infrared analyses of the trapped peaks.

The effect of promoters and variation in reaction conditions on the dehydrogenation of acrylonitrile dimer or 1,2-dicyanocyclobutane are summarized in the table.

The data in the table show that iodine, sulfur monochloride, sulfur, iodine monochloride, isopropyl iodide, tertiary butyl peroxide and benzoyl peroxide are effective for promoting the formation of the 1,2-dicyanocyclobutene with iodine and sulfur monochloride being the preferred promoters. Although iodine is an effective promoter for this chlorinative dehydrogenation, the use of iodine by itself as a dehydrogenating agent is totally ineffective for this purpose, even after heating the reactants for 6 hours at 90° C.

Because higher concentrations of chlorine are present during the latter stages of the experiment, the beneficial effects of the sulfur monochloride additive were enhanced by a concurrent feeding of the acrylonitrile dimer and chlorine throughout the operation. The maximum conversion of 1,2-dicyanocyclobutane to 1,2-dicyanocyclobutene was achieved at 160° C. At higher temperatures the loss of product through decomposition became excessive.

We claim:
1. The process for preparing a compound having the structure

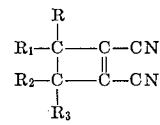

wherein R, $R_1$, $R_2$ and $R_3$ is each independently hydrogen or alkyl containing from 1 to 6 carbon atoms comprising reacting at a temperature of from 75 to 150° C. a 1,2-dicyanocyclobutane having the structure

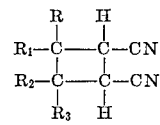

wherein R, $R_1$, $R_2$ and $R_3$ have the foregoing designations with from 0.01 to 1.0 mole of molecular chlorine per mole of said 1,2-dicyanocyclobutane in the presence of from 0.25 to 10% by weight based on the weight of said 1,2-dicyanocyclobutane of at least one promoter selected from the group consisting of iodine, iodine monochloride, sulfur, monochloride, isopropyl iodide, sulfur, benzoyl peroxide and tertiary butyl peroxide.

2. The process of claim 1 wherein R, $R_1$, $R_2$ and $R_3$ are hydrogen and the promoter is iodine.

3. The process of claim 1 wherein R, $R_1$, $R_2$ and $R_3$ are hydrogen and the promoter is iodine monochloride.

4. The process of claim 1 wherein R, $R_1$, $R_2$ and $R_3$ are hydrogen and the promoter is sulfur monochloride.

5. The process of claim 1 wherein R, $R_1$, $R_2$ and $R_3$ are hydrogen and the promoter is isopropyl iodide.

6. The process of claim 1 wherein R, $R_1$, $R_2$ and $R_3$ are hydrogen and the promoter is sulfur.

7. The process of claim 1 wherein R, $R_1$, $R_2$ and $R_3$ are hydrogen and the promoter is benzoyl peroxide.

8. The process of claim 1 wherein R, $R_1$, $R_2$ and $R_3$ are hydrogen and the promoter is tertiary butyl peroxide.

TABLE 6

| Additive (wt. percent) | Reaction temp. range (°C.) | Reaction time (hrs.) | Mole percent conversion of 1-2-dicyanocyclobutane to 1,2-dicyanocyclobutene | 1,2-dicyanocyclobutene, percent yield |
|---|---|---|---|---|
| Control (No additive) | 106–126 | 3.0 | 10 | 21 |
| 10% $I_2$ | 110–120 | 1.5 | 60 | 95 |
| 7% $I_2$ | 75–110 | 1.5 | 43 | 86 |
| 10% S | 120–125 | 4.5 | 35 | 60 |
| 10% i-PrI | 85–95 | 1.5 | 32 | 70 |
| 12.6% ICl | 60–130 | 3.0 | 28 | 100 |
| 10% n-$C_{12}H_{25}SH$ | 90–100 | 2.0 | 20 | 64 |
| 3% t-$Bu_2O_2$ | 110–120 | 1.0 | 25 | 53 |
| 1% $S_2Cl_2$ | 90–95 | 1.0 | 27 | 80 |
| 10% $S_2Cl_2$ | 92 | 2.5 | 27 | 43 |
| 1% $S_2Cl_2$* | 100–180 | 1.0 | 27 | 100 |
| 1% $S_2Cl_2$* | 150 | 3.75 | 55 | 95 |
| 0.3% benzoyl peroxide | 80 | 2.0 | 27 | 53 |
| $I_2$ control (No chlorine) | 90 | 6 | 0 | 0 |

*Concurrent flow of 1,2-dicyanocyclobutane and $Cl_2$.

No references cited.

CHARLES B. PARKER, *Primary Examiner.*
JOSEPH P. BRUST, *Examiner.*